N. H. Howard.
Stove Pipe Shelf.

Nº 90,102. Patented May 18, 1869.

Witnesses.
F. S. Fenton
Hugh Lee

Inventor.
Nelson H. Howard

United States Patent Office.

NELSON H. HOWARD, OF BELOIT, WISCONSIN.

Letters Patent No. 90,102, dated May 18, 1869.

STOVE-PIPE SHELF.

The Schedule referred to in these Letters Patent and making part of the same.

*To all whom it may concern:*

Be it known that I, NELSON H. HOWARD, of the city of Beloit, of Rock county, in the State of Wisconsin, have invented certain new and useful Improvements in Stove-Pipe Shelves and grates combined; and I do hereby declare the following description and accompanying drawings are sufficient to enable any person skilled in the art or science to which it most nearly appertains, to make and use my said invention, or improvements, without further invention or experiment.

The nature of my invention and improvements consists in the construction and arrangement of a new and novel device, intended to be used for the general purpose of a stove-pipe shelf, but when not thus in use, the rack or barred piece, which is detachable at pleasure, may be employed for the purpose of a common grate in the stove-oven, or laid on the top of the stove, and smoothing-irons placed thereon, and for other useful purposes. In the meanwhile, the projecting arms of the frame, or yoke remaining upon the pipe, may be conveniently used for hanging up many articles of kitchen-furniture or cooking-utensils; or the frame, or yoke may be removed from the pipe, when not desired for use, with great facility.

In the drawings—

Letter A represents the shelf, or grate.

B, the frame, or yoke, having arms G for supporting the grate, or shelf, and lips E, under which the inner bar of the grate impinges, or hinges, for preventing it from tipping and falling from the frame, as shown.

Figure 1:
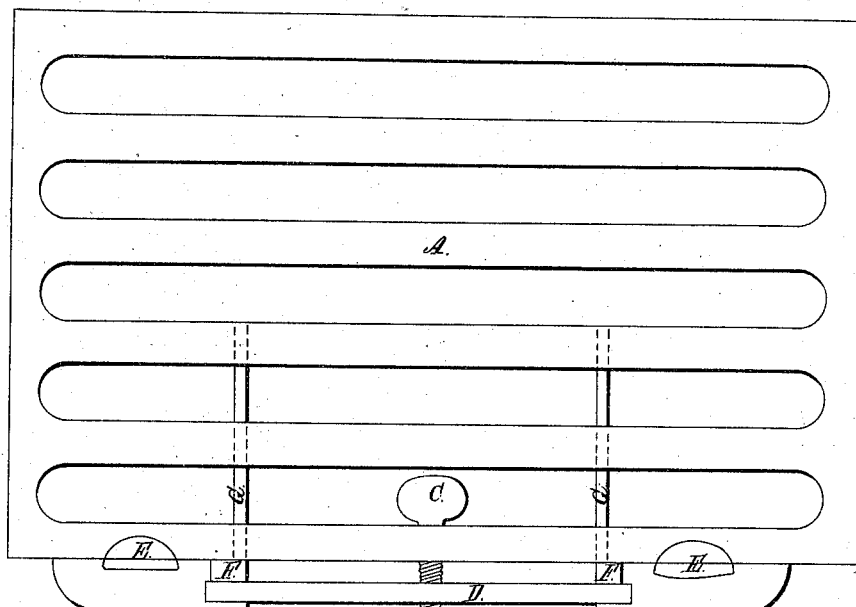
Figure 1 is a perspective view of the combined shelf, or grate, and frame, or yoke complete.
Figure 4:
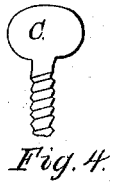
Figure 4 represents the thumb-screw used in connection therewith for that purpose.
Figure 3:
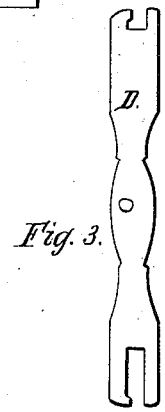
Figure 3 is a detached view of the clamping-bar, used to secure the frame, or yoke to the stove-pipe.
Figure 2:
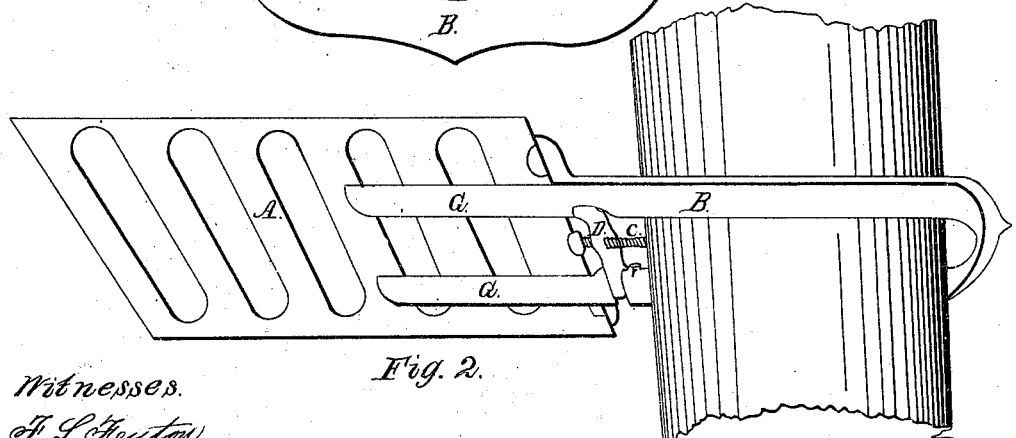
Figure 2 is an angling under-side view of the same.

D is a clamping-bar, as seen in fig. 3, provided with peculiar-shaped slots at either end, which embrace and engage with the frame B, suitably fitted therefor, as shown at F F, in fig. 1, which letters also indicate raised pieces, or shoulders, for supporting the clamping-bar D, when acted upon by the screw C in clamping the yoke to the pipe.

This yoke is adjustable to any size of pipe from five to seven inches; thus, supposing the yoke to be seven inches wide inside, from right to left, and the pipe only five inches in diameter, place the bar D inside the inner shoulders F F, which we will call seven inches from the closed end of the frame B, or from the points thereof, engaging with the pipe; then turn the screw stoutly against the front of the pipe, which will cause it to bulge, or elongate to the right and left, completely filling the yoke, so that the whole will be firmly secured in position; and inasmuch as a seven-inch pipe would quite fill the yoke, it would not require to be pressed out of shape, nor would a six-inch pipe, to a degree much noticeable, the latter also being the size most in use. This characteristic of adjustability, in the manner stated, is believed to be of much value, as well as convenience, in the use of the device herein described.

What I claim as my invention and improvements, and desire to secure by Letters Patent, is—

The yoke B, provided with the arms G and lips E, in combination with the shelf A, bar D, and screw C, all arranged and operating substantially as described.

NELSON H. HOWARD.

Witnesses:
F. S. FENTON,
HUGH LEE.